United States Patent
Zamir et al.

(10) Patent No.: US 10,348,994 B2
(45) Date of Patent: Jul. 9, 2019

(54) INTENSITY IMAGE ACQUISITION FROM DYNAMIC VISION SENSORS

(71) Applicant: SAMSUNG ELECTRONICS CO., LTD., Suwon-si, Gyeonggi-Do (KR)

(72) Inventors: Lior Zamir, Ramat Hasharon (IL); Nathan Henri Levy, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 8 days.

(21) Appl. No.: 15/480,972

(22) Filed: Apr. 6, 2017

(65) Prior Publication Data

US 2018/0295298 A1   Oct. 11, 2018

(51) Int. Cl.
- *H04N 5/378* (2011.01)
- *H04N 5/3745* (2011.01)
- *H04N 5/353* (2011.01)
- *H04N 5/235* (2006.01)

(52) U.S. Cl.
CPC ........... *H04N 5/378* (2013.01); *H04N 5/3535* (2013.01); *H04N 5/3745* (2013.01); *H04N 5/2351* (2013.01)

(58) Field of Classification Search
CPC ....... H04N 5/353; H04N 5/378; H04N 5/3765
See application file for complete search history.

(56) References Cited

U.S. PATENT DOCUMENTS

| 8,780,240 B2 | 7/2014 | Posch et al. | |
| 9,257,461 B2 | 2/2016 | Cho et al. | |
| 2013/0135486 A1* | 5/2013 | Wan | H04N 5/765 348/207.99 |
| 2014/0326854 A1* | 11/2014 | Delbruck | H04N 5/378 250/204 |
| 2017/0003121 A1 | 1/2017 | Brandli et al. | |

* cited by examiner

*Primary Examiner* — Ahmed A Berhan
(74) *Attorney, Agent, or Firm* — F. Chau & Associates, LLC (57) ABSTRACT

A method for acquiring intensity images through a dynamic vision sensor is provided, the method including resetting an inner state of each of a plurality of pixels in the dynamic vision sensor to a predetermined value; receiving from at least one of the plurality of pixels an event signal based on a change in its inner state indicative of a difference in amount of light incident upon the at least one of the plurality of pixels versus that corresponding to the predetermined value; and integrating over a time period the received event signal for the at least one of the plurality of pixels to determine the intensity of light incident upon the at least one of the plurality of pixels.

20 Claims, 8 Drawing Sheets

INTENSITY IMAGE ACQUISITION FROM DYNAMIC VISION SENSORS

TECHNICAL FIELD

Embodiments of the present disclosure relate to image processing, and more particularly to a system and method for acquiring intensity images from dynamic vision sensors.

DISCUSSION OF RELATED ART

Traditionally, intensity images have been obtained from frame-based cameras. Event-based cameras are generally based on dynamic vision sensors (DVS), which output a stream of asynchronous event data that represents the temporal changes in light intensity incident upon each pixel. In such a DVS, the internal integrative pixel state is not provided as output. When the intensity of light upon a pixel changes by a threshold amount, an event may be triggered that references or includes the pixel location, the time of change at that pixel and the sign of that change.

SUMMARY

An exemplary embodiment intensity image acquisition circuit is provided for acquiring intensity images through a dynamic vision sensor, the acquisition circuit including a dynamic vision sensor (DVS) having a plurality of pixels, each pixel having a photodiode circuit, a current-to-voltage converter circuit connected to the photodiode circuit, a reset circuit connected to the converter circuit, and a current comparator circuit connected to the reset circuit; a timing circuit connected to the plurality of pixels through the reset circuit; and an integration circuit connected to the comparator circuit, and further connected to the timing circuit, the integration circuit configured to form pixel intensity data by integrating events for each of the plurality of pixels, and provide the integrated pixel data as intensity image outputs, wherein the reset circuit is configured to reset inner states of each of the plurality of pixels upon a signal from the timing unit.

The circuit may include an output splitter circuit connected to the plurality of pixels through an events circuit, and connected to the timing circuit, the output splitter configured to separate events output by the plurality of pixels from events output by other pixels. The circuit may include an events circuit connected to the splitter through a regular events circuit, the events circuit configured to receive events from the other pixels and provide them as event-based outputs.

The circuit may be used where the events circuit is configured for event signal processing and packetization. The circuit may include an interface circuit connected to the integration circuit and events circuit. The circuit may be used where the interface circuit comprises two output channels. The circuit may also be used where a first of the two output channels is configured for providing integrated image intensity data. The circuit may further be used where a second of the two output channels is configured for providing event-based data.

The circuit may be used where at least the current-to-voltage converter circuit, the reset circuit, and the current comparator circuit are implemented in CMOS.

An exemplary embodiment method is provided for acquiring intensity images through a dynamic vision sensor, including resetting an inner state of each of a plurality of pixels in the dynamic vision sensor to a predetermined value; receiving from at least one of the plurality of pixels an event signal based on a change in its inner state indicative of a difference in amount of light incident upon the at least one of the plurality of pixels versus that corresponding to the predetermined value; and integrating over a time period the received event signal for the at least one of the plurality of pixels to determine the intensity of light incident upon the at least one of the plurality of pixels.

The method may be used where the at least one of the plurality of pixels comprises a photodiode. The method may further be used where the inner state is indicative of the current through the photodiode. The method may be used where the event signal is indicative of a change in the inner state reaching a threshold. The method may further be used where the threshold is based on a logarithmic scale.

The method may be used where the predetermined value is indicative of no light incident upon each of the plurality of pixels. The method may be used where the predetermined value is indicative of an averaged amount of light incident upon each of the plurality of pixels. The method may be used where the predetermined value is indicative of a threshold amount of light incident upon each of the plurality of pixels. The method may be used where the event signal is received in close temporal proximity to the resetting. The method may be used where the predetermined value for the plurality of pixels is different than a second predetermined value for a second plurality of pixels in the dynamic vision sensor. The method may be used where the integration time period for the event signal corresponding to the at least one of the plurality of pixels is different than a second integration time period corresponding to at least one of a second plurality of pixels in the dynamic vision sensor.

The method may include using the same event signal to detect and output luminance change events as well as image intensities for the at least one of the plurality of pixels in the dynamic vision sensor. The method may comprise including in the integration the predetermined value if it is non-zero.

An exemplary embodiment image acquisition device is provided, including a dynamic vision sensor (DVS) having a plurality of pixels, each pixel having an inner state indicative of light intensity upon that pixel and an event output indicative of a threshold change in its inner state; a timing unit connected to the plurality of pixels through a reset circuit, the reset circuit configured to reset the inner states of each of the plurality of pixels upon a signal from the timing unit; and an integration unit connected in signal communication with the DVS, and further connected to the timing unit through a synchronization circuit, the integration unit configured to form pixel intensity data by integrating events for each of the plurality of pixels, and provide the integrated pixel data as intensity image outputs.

The device may include an output splitter connected to the plurality of pixels through an events circuit, and connected to the timing unit through the synchronization circuit, the output splitter configured to separate events output by the plurality of pixels from events output by other pixels. The device may further include an events unit connected to the splitter through a regular events circuit, the events unit configured to receive events from the other pixels and provide them as event-based outputs.

The device may have the events unit configured for event signal processing and packetization. The device may include an interface unit connected to the integration unit and connected to the events unit. The device may include an interface unit having two output channels. The device may further include a first output channel configured for providing integrated image intensity data. The device may include a second output channel configured for providing event-based data.

An exemplary embodiment program storage device is provided, tangibly embodying a program of instruction steps executable by a processor for acquiring intensity images through an dynamic vision sensor, the instruction steps including resetting an inner state of each of a plurality of pixels in the dynamic vision sensor to a predetermined value; receiving from at least one of the plurality of pixels an event signal based on a change in its inner state indicative of a difference in amount of light incident upon the at least one of the plurality of pixels versus that corresponding to the predetermined value; and integrating over a time period the received event signal for the at least one of the plurality of pixels to determine the intensity of light incident upon the at least one of the plurality of pixels. The program storage device may further include instruction steps using the same event signal to detect and output luminance change events as well as image intensities for the at least one of the plurality of pixels in the dynamic vision sensor.

BRIEF DESCRIPTION OF THE DRAWINGS

Aspects of the present disclosure may be appreciated upon consideration of the following description of exemplary embodiments when taken in conjunction with the accompanying drawings, in which.

DETAILED DESCRIPTION

A system and method for intensity image acquisition provides pixel light-intensity data derived from dynamic vision sensors (DVS) or event-based cameras, for which each pixel is only sensitive to changes in light intensity. This may be achieved by resetting the states of a selected set of DVS pixels and then accumulating the events output by those pixels. The number of events output by each such pixel following the reset may be proportional to the light intensity upon that pixel.

Figure 1:
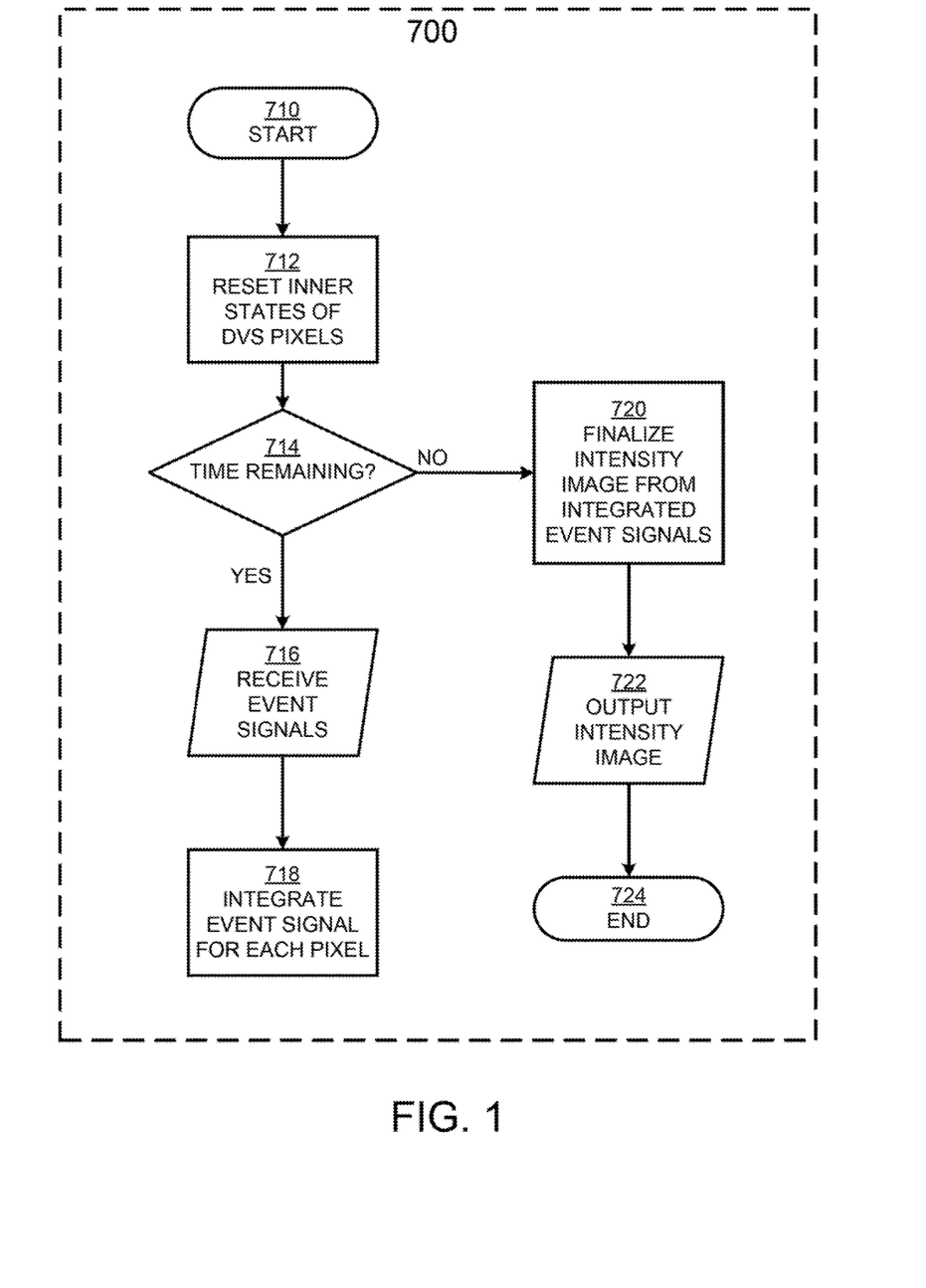
FIG. 1 is schematic flow diagram for a method of intensity image acquisition in accordance with an exemplary embodiment of the present disclosure.

As shown in FIG. 1, a method for acquiring intensity images through a dynamic vision sensor in accordance with an exemplary embodiment of the present disclosure is indicated generally by the reference numeral 700. The method includes a start block 710 that passes control to a function block 712. The function block 712 initiates an integration interval and resets the inner states of a plurality of pixels in the dynamic vision sensor, such as in a region of interest (ROI), and passes control to a decision block 714. The decision block 714 determines whether there is time remaining in the integration interval, and if so passes control to an input block 716, but if not passes control to a function block 720.

The input block 716 receives event signals from any of the plurality of pixels emitting an event indicative of a threshold increase or decrease in that pixel's inner state, and passes control to a function block 718. The function block 718 integrates the event signal for each pixel with its previous state, and passes control back to the decision block 714.

The function block 720, which is reached when there is no time remaining in the integration interval, finalizes an intensity image based on the integrated event signals, and passes control to an output block 722. The output block, in turn, outputs the intensity image, and passes control to an end block 724.

Thus, the method 700 resets an inner state of each of a plurality of pixels in the dynamic vision sensor to a predetermined value, receives from at least one of the plurality of pixels an event signal based on a change in its inner state indicative of a difference in amount of light incident upon the at least one of the plurality of pixels versus that corresponding to the predetermined value, and integrates over a time period the received event signal for the at least one of the plurality of pixels to determine the intensity of light incident upon the at least one of the plurality of pixels.

Although the looping method of FIG. 1 has been shown and described for ease of explanation, alternate embodiments may use interrupt-driven methods or the like to achieve high-resolution accuracy or meet design criteria. It shall be understood that the integration interval itself may be pre-determined and/or fixed for a given application, but that it may also be variable such as for changes in ambient lighting, for example.

Figure 2:
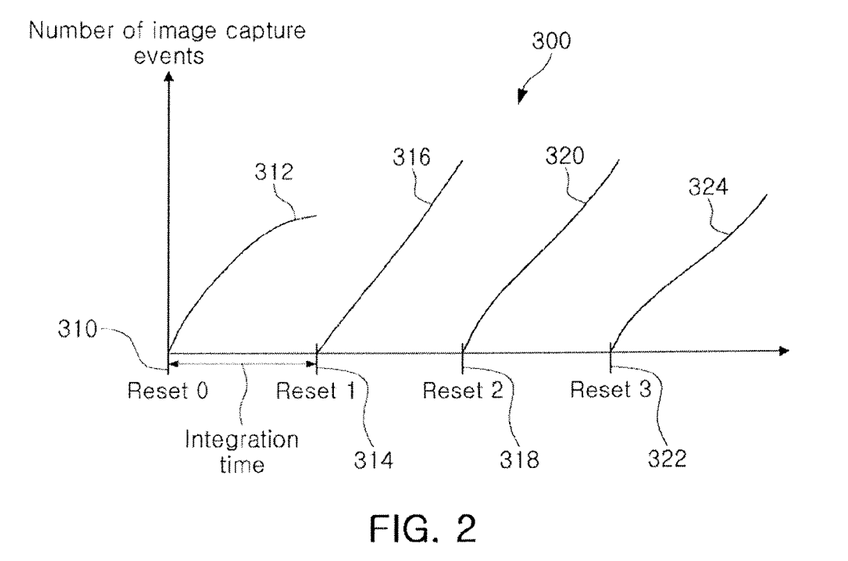
FIG. 2 is a time-wise graphical diagram for an image capture reset step in accordance with an exemplary embodiment of the present disclosure.

Turning to FIG. 2, a time-wise plot for an image capture reset step, such as depicted in function block 712 of FIG. 1, is indicated generally by the reference numeral 300. Here, the horizontal axis represents time and the vertical axis represents the number of image capture events. Following a zeroth reset at time 310, the curve 312 represents the number of image capture events during a first integration time interval. Following a first reset at time 314, the curve 316 represents the number of image capture events during a second integration time interval. Following a second reset at time 318, the curve 320 represents the number of image capture events during a third integration time interval. Following a third reset at time 322, the curve 324 represents the number of image capture events during a fourth integration time interval.

Figure 3:
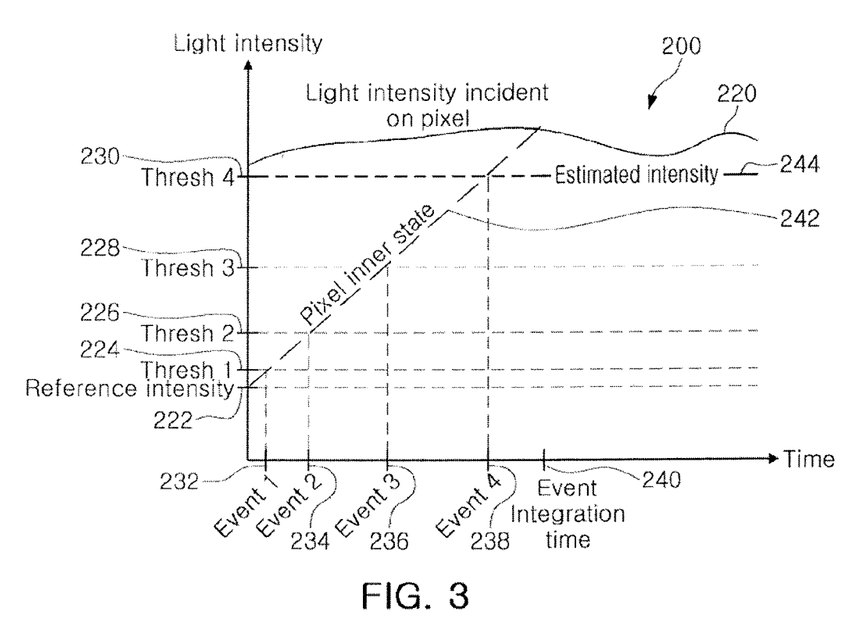
FIG. 3 is a time-wise graphical diagram for an image capture integration process over multiple events from a single pixel during an integration time interval in accordance with an exemplary embodiment of the present disclosure.

Turning now to FIG. 3, a time-wise plot for an image capture integration process over multiple events from a single pixel during an integration time interval, such as depicted in function block 718 of FIG. 1, is indicated generally by the reference numeral 200. Here, the horizontal axis represents time and the vertical axis represents light intensity. On the light intensity axis, an exemplary non-zero reset or reference intensity 222 is below a first threshold 224, which is below a second threshold 226, which is below a third threshold 228, which, in turn, is below a fourth threshold 230.

On the time axis, the origin indicates the time at which the reference intensity was reset, a first event 232 indicates the time at which the pixel inner state 242 reached the first threshold 224, a second event 234 indicates the time at which the pixel inner state 242 reached the second threshold 226, a third event 236 indicates the time at which the pixel inner state 242 reached the third threshold 228, a fourth event 238 indicates the time at which the pixel inner state 242 reached the fourth threshold 230, and the event integration time 240 indicates the time limit for accumulating the events. Thus, the estimated intensity 244 represents the exemplary embodiment's estimate of the actual incident light intensity 220 as measured within the event integration time and subject to the resolution of the logarithmic threshold implemented.

Figure 4:
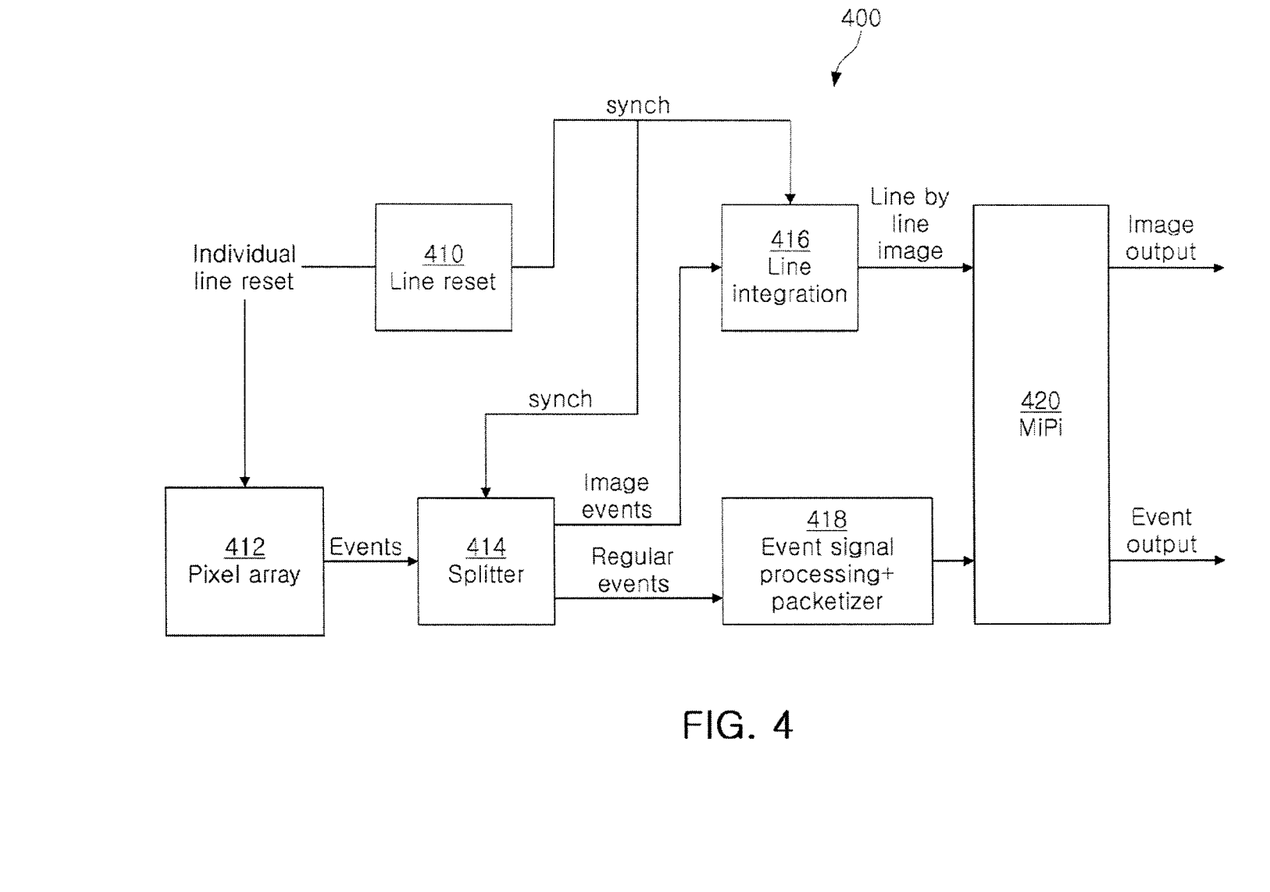
FIG. 4 is a schematic block diagram for an intensity image acquisition system in accordance with an exemplary embodiment of the present disclosure.

As shown in FIG. 4, an image capture system in accordance with an exemplary embodiment of the present disclosure is indicated generally by the reference numeral 400. The image capture system 400 includes a region or line reset timing unit 410, a dynamic vision sensor (DVS) pixel array 412 connected to the timing unit through a region or line reset circuit, an output splitter 414 connected to the plurality of pixels through an events circuit and connected to the timing unit through a synchronization circuit, an events unit 418 connected to the splitter through an events circuit, a region or line integration unit 416 connected to the splitter through the events circuit and connected to the timing unit through the synchronization circuit, and an interface unit 420, such as a MIPI® compliant camera interface, connected to the region or line integration unit and further connected to the events unit.

Figure 5:
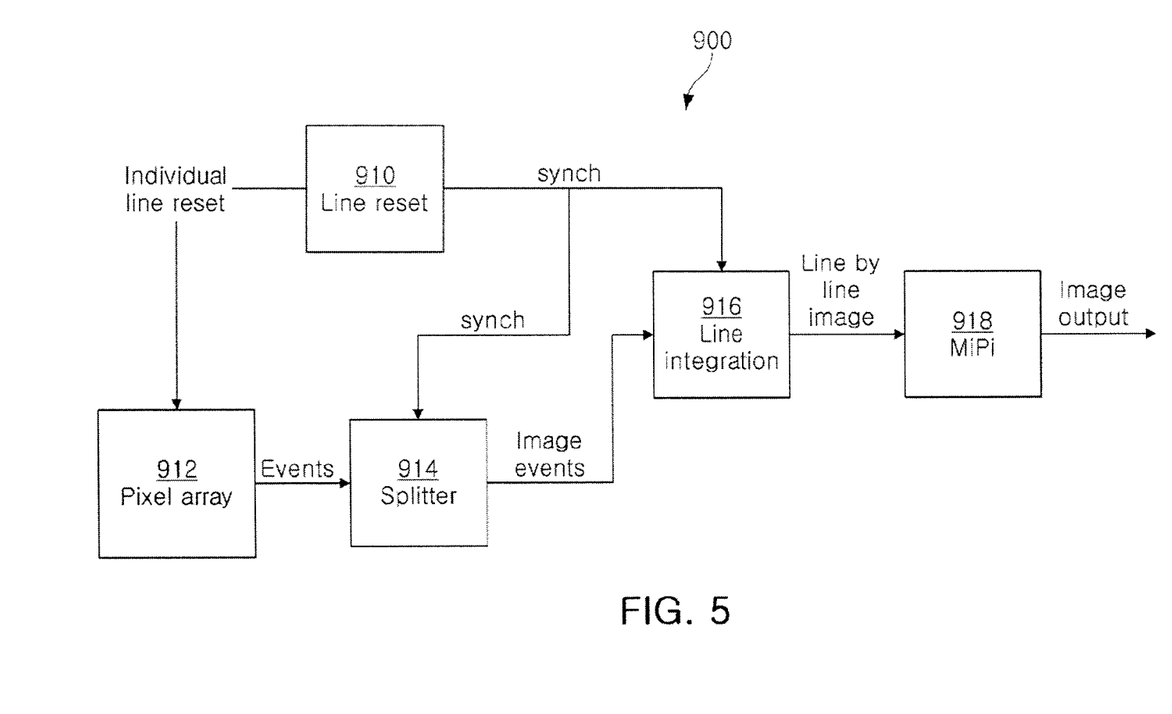
FIG. 5 is a schematic block diagram for an intensity image acquisition system in accordance with an exemplary embodiment of the present disclosure.

Turning now to FIG. 5, an image capture system in accordance with an exemplary embodiment of the present disclosure is indicated generally by the reference numeral 900. The image capture system 900 includes a region or line reset timing unit 910, a dynamic vision sensor (DVS) pixel array 912 connected to the timing unit through a region or line reset circuit, an output splitter 914 connected to the plurality of pixels through an events circuit and connected to the timing unit through a synchronization circuit, a region or line integration unit 916 connected to the splitter through the events circuit and connected to the timing unit through the synchronization circuit, and an interface unit 920, such as a MIPI® compliant camera interface, connected to the region or line integration unit and further connected to the events unit. In alternate embodiments, the splitter may be optional if no event output is provided.

Figure 6:
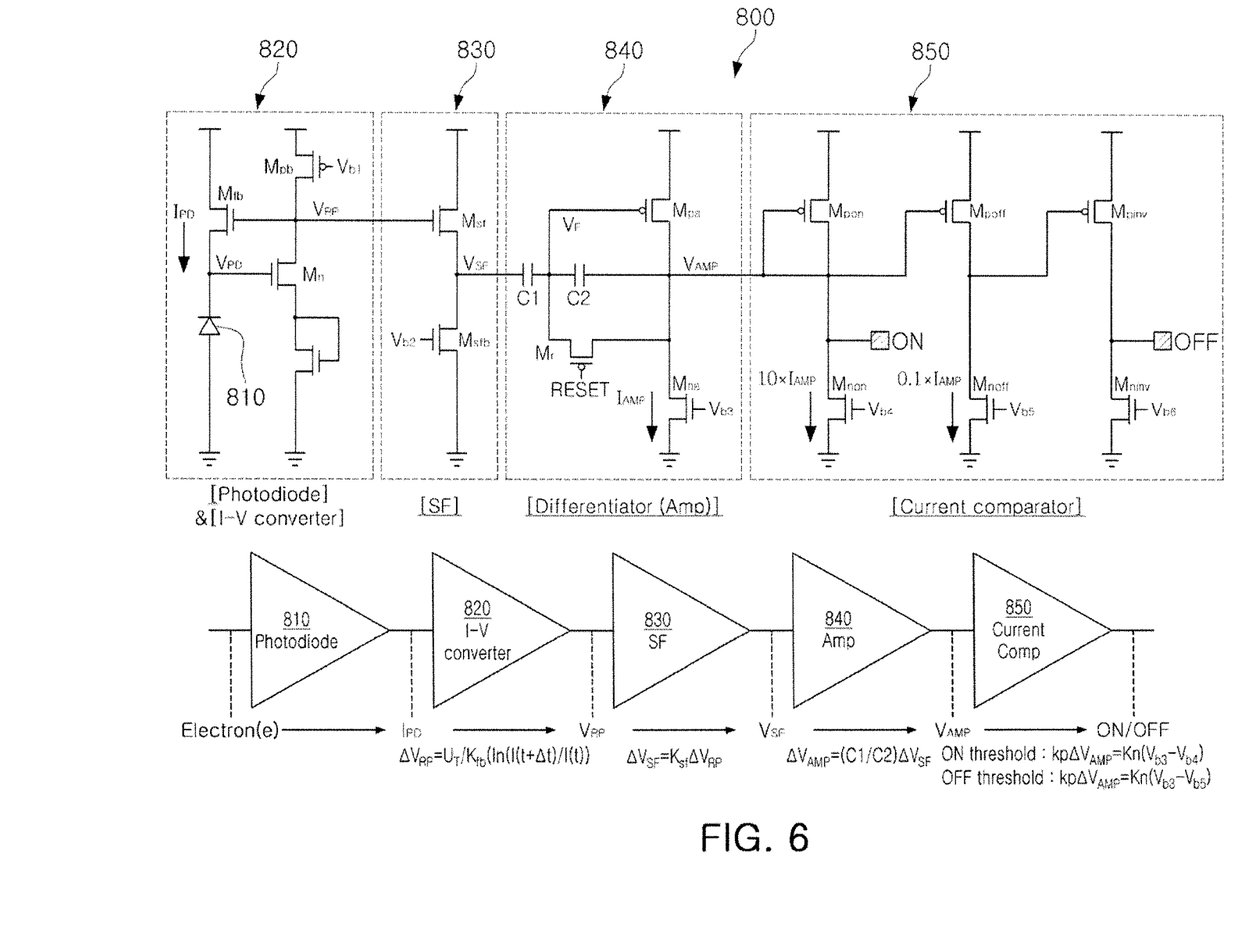
FIG. 6 is a schematic circuit diagram for a pixel of a dynamic vision sensor in accordance with an exemplary embodiment of the present disclosure.

Turning to FIG. 6, a pixel of an exemplary dynamic vision sensor (DVS) is indicated generally by the reference numeral 800. The pixel 800 includes a photodiode 810 connected to a current to voltage (I-V) converter 820, the I-V converter including up to four transistors; a source-follower (SF) 830 connected to the I-V converter, the SF including up to two transistors; a differentiator amplifier (Amp) 840 connected to the SF, the Amp including up to three transistors; and a current comparator 850 connected to the Amp, the current comparator including up to six transistors. Thus, each pixel of the dynamic vision sensor may include one photodiode and up to 15 transistors.

In greater detail, the photodiode 810 is configured with its anode connected to ground voltage and its cathode connected to a node with voltage potential $V_{PD}$. In the converter 820, an N-channel MOSFET (NMOS) transistor $M_{fb}$ has its drain connected to power voltage, source connected to the $V_{PD}$ node, and gate connected to $V_{RP}$. Thus, an induced current $I_{PD}$ flows from power to ground through $M_{fb}$ and the photodiode 810. A P-channel MOSFET (PMOS) transistor $M_{pb}$ has its source connected to power, drain connected to $V_{RP}$, and gate connected to $V_{b1}$. An NMOS transistor $M_n$ has its gate connected to $V_{PD}$, drain connected to $V_{RP}$, and source connected to the drain and gate of another NMOS having its source connected to ground.

In the SF 830, an NMOS transistor $M_{sf}$ has its gate connected to $V_{RP}$, drain connected to power, and source connected to a node with potential $V_{SF}$. Another NMOS transistor $M_{sfb}$ has its source connected to ground, drain connected to $V_{SF}$, and gate connected to $V_{b2}$.

In the amplifier 840, a capacitor C1 is connected between $V_{SF}$ and $V_F$, and another capacitor C2 is connected between $V_F$ and $V_{AMP}$. A PMOS transistor $M_{pa}$ has gate to $V_F$, source to power, and drain to $V_{AMP}$. Another PMOS transistor $M_r$ has drain to $V_F$, source to $V_{AMP}$, and gate connected to a RESET terminal. An NMOS transistor $M_{na}$ has drain to $V_{AMP}$, source to ground, and gate to $V_{b3}$. A current $I_{AMP}$ flows across $M_{na}$ to ground.

In the comparator 850, a PMOS transistor $M_{pon}$ has gate to $V_{AMP}$, source to power, and drain to an ON terminal. An NMOS transistor $M_{non}$, in turn, has gate to $V_{b4}$, drain to the ON terminal, and source to ground. Another PMOS transistor $M_{poff}$ has gate to $V_{AMP}$, source to power, and drain to gate of PMOS $M_{pinv}$ and drain of NMOS $M_{noff}$. The NMOS transistor $M_{noff}$, in turn, has gate to $V_{b5}$, and source to ground. Here, a current of $0.1 \times I_{AMP}$ flows across $M_{noff}$ to ground. The PMOS $M_{pinv}$ has source to power and drain to an OFF terminal, while an NMOS $M_{ninv}$ has drain to the OFF terminal and source to ground.

In operation with reference to the equations set forth below, electrons produced by the photodiode 810 produce the current $I_{PD}$, which the I-V converter 820 uses to produce a change in the voltage $V_{RP}$ according to the formula of Equation 1.

$$\Delta V_{RP} = U_T/k_{fb}(\ln(I(t+\Delta t)/I(t))) \quad \text{(EQN. 1)}$$

The SF 830, in turn, uses the change in voltage $V_{RP}$ to produce a change in voltage $V_{SF}$ according to Equation 2.

$$\Delta V_{SF} = k_s \Delta V_{RP} \quad \text{(EQN. 2)}$$

The Amp 840 uses the change in voltage $V_{SF}$ to produce a change in voltage $V_{AMP}$ according to Equation 3.

$$\Delta V_{AMP} = (C1/C2)\Delta V_{SF} \quad \text{(EQN. 3)}$$

At an ON threshold, the current comparator 850 produces an output according to Equation 4.

$$\text{ON threshold: } kp\Delta V_{AMP} = kn(V_{b3} - V_{b4}) \quad \text{(EQN. 4)}$$

At an OFF threshold it produces an output according to Equation 5.

$$\text{OFF threshold: } kp\Delta V_{AMP} = kn(V_{b3} - V_{b5}) \quad \text{(EQN. 5)}$$

Table A represents an exemplary data sheet for the DVS of FIG. 6.

TABLE A

| Resolution | | | VGA (640 × 480) |
|---|---|---|---|
| Pixel Pitch | | mm | 9 |
| Chip Size | | mm2 | 9.7 × 8.0 |
| Voltage | Analog | V | 1.35~1.65 (1.5 ± 10%) |
| | Bias | V | 2.52~3.08 (2.8 ± 10%) |
| Temperature | | ° C. | 25~90 |

TABLE A-continued

| | | | |
|---|---|---|---|
| Illumination Dynamic range | | dB | 66 (5~10,000 Lux) |
| Minimum Contrast Sensitivity | | % | 19 |
| Stationary Noise | <100 Lux | EPS | 0.12 |
| Event per pixel | <10,000 Lux | EPS | 0.048 |
| Peak Event Data Rate | Single AER | EPS | 5.2 |
| Pixel Response Latency | @250 Lux | msec | 40(On)/160 (Off) |
| | @750 Lux | msec | 6 (On)/55 (Off) |
| Power Consumption (Low Activity) | Pixel | mW | 3 |
| | Bias Gen. | mW | 2 |
| | AER & Logic | mW | 3 |
| Power Consumption (High Activity) | Pixel | mW | 3 |
| | Bias Gen. | mW | 2 |
| | AER & Logic | mW | 10 |

With reference to FIGS. 4 and 6, the system 400 includes the DVS 412 having pixels 800, each pixel having an inner state indicative of light intensity upon that pixel and an event output indicative of a threshold change in its inner state. The timing unit 410 is connected to the plurality of pixels through the reset circuit, where the reset circuit is configured to reset the inner states of each of the plurality of pixels upon a signal from the timing unit. The output splitter 414 is connected to the plurality of pixels 800 through an events circuit, and connected to the timing unit 410 through a synchronization circuit, where the output splitter is configured to separate events output by the plurality of pixels from events output by other pixels. The events unit 418 is connected to the splitter through an events circuit, where the events unit is configured to receive events from the other pixels and provide them as event-based outputs. The integration unit 416 is connected to the splitter through the events circuit, and connected to the timing unit through the synchronization circuit, where the integration unit is configured to form pixel intensity data by integrating the events for each of the plurality of pixels, and to provide the integrated pixel data as intensity image outputs.

Figure 7:
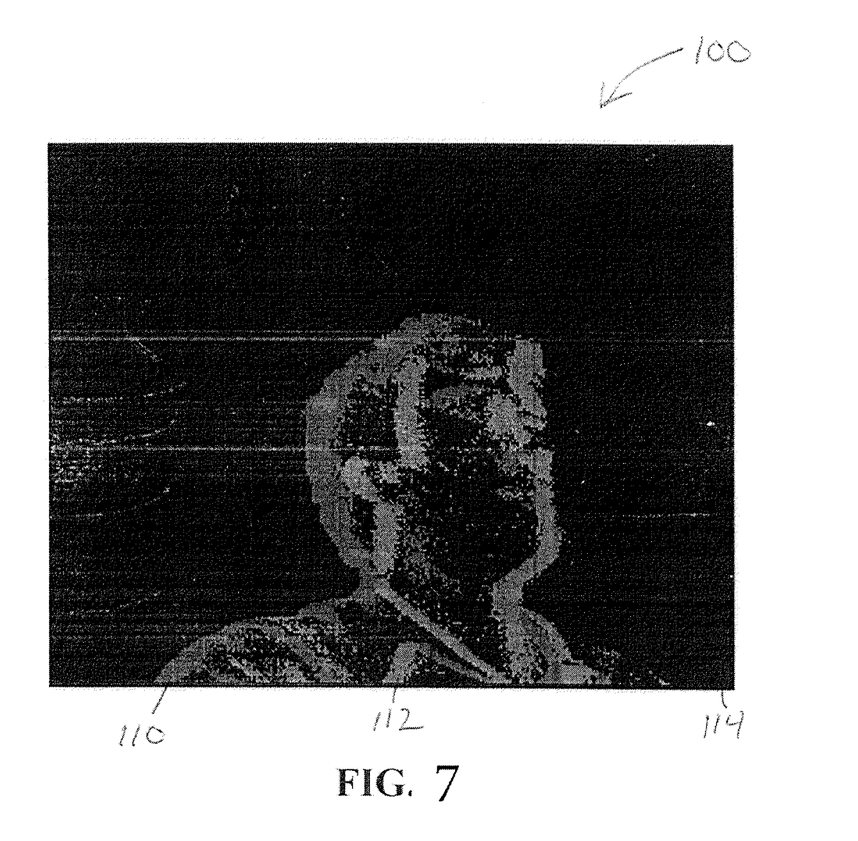
FIG. 7 is an image diagram for an output from an event camera over a short time interval in accordance with an exemplary embodiment of the present disclosure.

Turning now to FIG. 7, a typical output from an event-based camera over a short time interval is indicated generally by the reference numeral 100. Here, as a subject tilted backwards, the darker grey pixels 110 indicate positive events, the lighter grey pixels 112 indicate negative events, and the black pixels 114 indicate no events.

Figure 8:
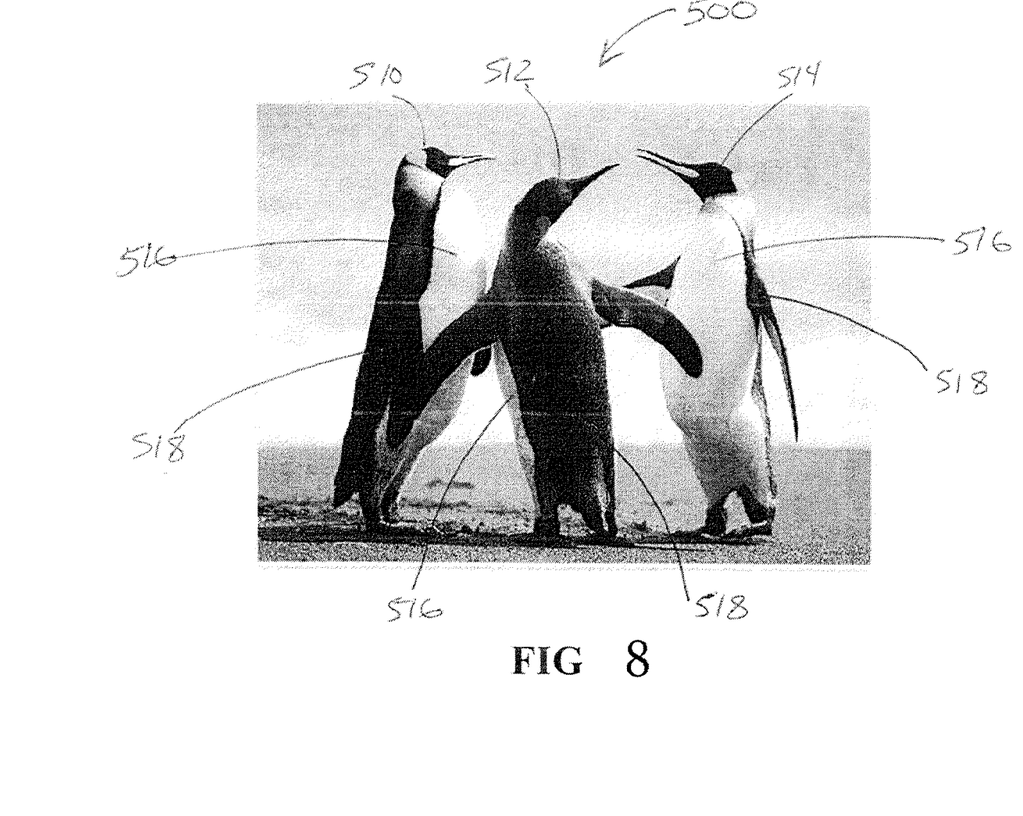
FIG. 8 is an image diagram for an input to an image capture system or method in accordance with an exemplary embodiment of the present disclosure.

As shown in FIG. 8, an input to an image capture system or method in accordance with an exemplary embodiment of the present disclosure is indicated generally by the reference numeral 500. The input image 500 includes three subject penguins 510, 512 and 514, each exhibiting light portions 516 and dark portions 518.

Figure 9:
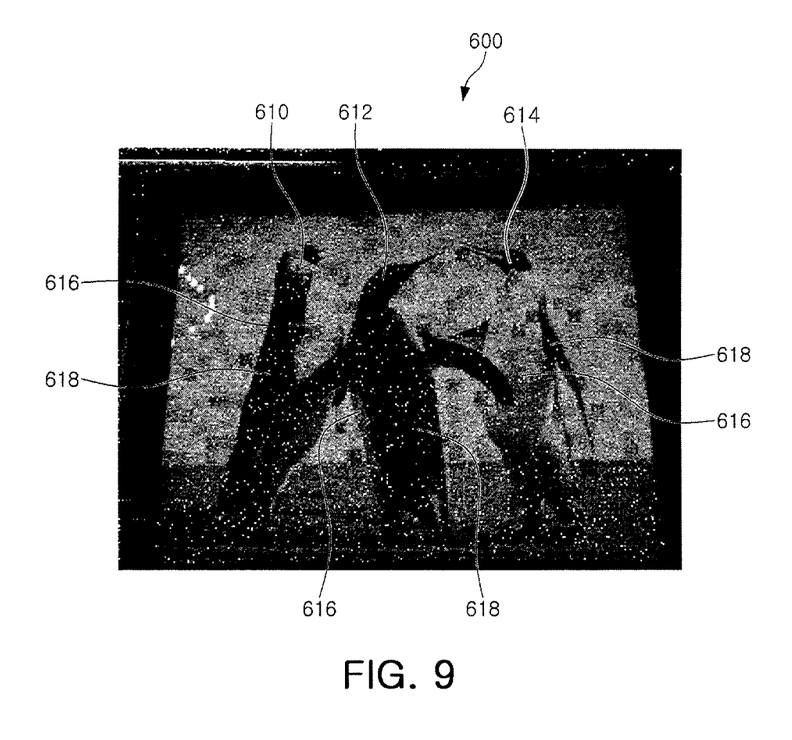
FIG. 9 is an image diagram for an output from an image capture system or method in accordance with an exemplary embodiment of the present disclosure.

Turning to FIG. 9, an output from an image capture system or method in accordance with an exemplary embodiment of the present disclosure is indicated generally by the reference numeral 600. The input image 600 includes the same three subject penguins of FIG. 6, here labeled 610, 612 and 614, and each exhibiting comparable light portions 616 and dark portions 618.

In a simulation, the input scene of FIG. 7 was presented to a DVS of FIGS. 5 and 6 employing the method of FIG. 1. The DVS was placed in front of a black screen. The original image was gradually displayed on the screen, and the events recorded by the DVS were accumulated, resulting in the output image of FIG. 8.

Embodiments of the present disclosure are preferably implemented with any dynamic vision sensor or event-based camera having the following three properties: 1) Each pixel has an inner state indicating the amount of light incident on the pixel, such as the current through a photodiode, where this state may be used to output an event when sufficient change to the amount of incident light is detected. 2) There is a mechanism for setting this state to a predetermined value, such as setting the value to the equivalent state of no incident light incident, for a set of pixels. 3) The events triggered following the reset are output in close temporal proximity to the reset operation. In alternate embodiments, the inner state may be voltage across a phototransistor or the like.

Embodiments of the present disclosure enable output of luminance change events as well as image intensities through a dynamic vision sensor without the need for additional circuits per pixel such as to provide intensities directly, or for redundant pixel arrays as in frame-based sensors to differentiate dynamic changes. The present approach permits the use of basic dynamic vision sensors to provide both event-based and integrated image intensity results. Compared to traditional frame-based image sensors, DVS may achieve lower latency similar to a faster frame rate in traditional frame-based sensors. DVS latency is already under one millisecond.

In operation, a DVS or event-based camera outputs a signal triggered by changes in light intensity over time for each pixel. As disclosed herein, integrating the relevant event signal over time provides an indication of the light intensity currently incident upon the pixel relative to the intensity just prior to the integration.

The initial intensity or intensity offset is preferably known or selected. This may be achieved by explicitly resetting the intensity offset to a predetermined value, for example. The period of event accumulation following a reset is preferably kept short so as to minimize noise due to movements in the scene and/or sensor noise. Extracting a full intensity image from the sensor may entail performing this process in a gradual manner, each time measuring the intensities for a different set of the pixels, depending on the parameters of the application and bandwidth limitations of the sensor output.

Extracting an image portion, whether an area or region of interest, line, row or column, may be performed by resetting all corresponding pixels at once if this conforms with the bandwidth limitations of a given dynamic vision sensor. If desired, bandwidth requirements may be further reduced by increasing the threshold to provide a lower bit-depth intensity image.

Optionally, the process of acquiring an image from the event sensor may be performed as follows: 1. Divide an array of pixels into non-overlapping sets (e.g., regions, areas or lines, without limitation). 2. For each set of pixels: A. Activate a reset on this set of pixels. B. For a predetermined period or integration time, events coming from the current set of pixels are routed to an event accumulator that integrates the events, where the number of events accumulated for a pixel provides an estimate of its intensity, while other events from the other sets of pixels may be routed to the regular DVS event handling mechanism.

Preferred embodiments of the present disclosure enable the acquisition of regular images from event cameras with minimal adjustments on the sensor side and with the addition of an integration unit receiving the output signal. Embodiments of the acquisition process may enable the output of two substantially simultaneous event streams; one for intensity images and the other for regular events. Acquired images may benefit from the high dynamic range of appropriate DVS sensors. Moreover, a design or implementation trade-off may be made between image bit depth versus larger regions of interest (ROI) for simultaneous capture, as opposed to a gradual capture potentially susceptible to movements in the scene, by selecting or controlling the logarithmic intensity difference threshold.

Although exemplary embodiments of the present disclosure have been shown and described, it shall be understood that those of ordinary skill in the pertinent art may make changes therein without departing from the principles, scope or spirit of the inventive concept as defined by the appended claims and their equivalents.

What is claimed is:

1. A method for acquiring intensity images through a dynamic vision sensor, the method comprising:
   resetting an inner state of each of a plurality of pixels in the dynamic vision sensor to a predetermined value, wherein the predetermined value is indicative of an amount of light incident upon each of the plurality of pixels;
   receiving from at least one of the plurality of pixels an event signal based on a change in its inner state indicative of a difference in amount of light incident upon the at least one of the plurality of pixels versus that corresponding to the predetermined value; and
   integrating over a time period the received event signal for the at least one of the plurality of pixels to determine an intensity of light incident upon the at least one of the plurality of pixels.

2. The method of claim 1 wherein the at least one of the plurality of pixels comprises a photodiode.

3. The method of claim 2 wherein the inner state is indicative of a current through the photodiode.

4. The method of claim 1 wherein the event signal is indicative of a change in the inner state reaching a threshold.

5. The method of claim 4 wherein the threshold is based on a logarithmic scale.

6. The method of claim 1 wherein the predetermined value is indicative of no light incident upon each of the plurality of pixels.

7. The method of claim 1 wherein the predetermined value is indicative of an averaged amount of light incident upon each of the plurality of pixels.

8. The method of claim 1 wherein the predetermined value is indicative of a threshold amount of light incident upon each of the plurality of pixels.

9. The method of claim 1 wherein the event signal is received in close temporal proximity to the resetting.

10. The method of claim 1 wherein the predetermined value for the plurality of pixels is different than a second predetermined value for a second plurality of pixels in the dynamic vision sensor.

11. The method of claim 1 wherein the integration time period for the event signal corresponding to the at least one of the plurality of pixels is different than a second integration time period corresponding to at least one of a second plurality of pixels in the dynamic vision sensor.

12. The method of claim 1, further comprising using the same event signal to detect and output luminance change events as well as image intensities for the at least one of the plurality of pixels in the dynamic vision sensor.

13. An image acquisition device comprising:
   a dynamic vision sensor (DVS) having a plurality of pixels, each pixel having an inner state indicative of light intensity upon that pixel and an event output indicative of a threshold change in its inner state;
   a timing unit connected to the plurality of pixels through a reset circuit, the reset circuit configured to reset the inner states of each of the plurality of pixels upon a signal from the timing unit; and
   an integration unit connected in signal communication with the DVS, and further connected to the timing unit through a synchronization circuit, the integration unit configured to form pixel intensity data by integrating events for each of the plurality of pixels, and provide integrated pixel data as intensity image outputs.

14. The device of claim 13, further comprising an output splitter connected to the plurality of pixels through an events circuit, and connected to the timing unit through the synchronization circuit, the output splitter configured to separate events output by the plurality of pixels from events output by other pixels.

15. The device of claim 14, further comprising an events unit connected to the splitter through a regular events circuit, the events unit configured to receive events from the other pixels and provide them as event-based outputs.

16. The device of claim 15 wherein the events unit is configured for event signal processing and packetization.

17. The device of claim 15, further comprising an interface unit connected to the integration unit and connected to the events unit.

18. The device of claim 17 wherein the interface unit comprises two output channels.

19. The device of claim 18 wherein a first output channel is configured for providing integrated image intensity data.

20. The device of claim 18 wherein a second output channel is configured for providing event-based data.

* * * * *